United States Patent [19]

Hafele

[11] 4,357,296

[45] Nov. 2, 1982

[54] INJECTION BLOW MOLDING PROCESS

[75] Inventor: Robert X. Hafele, Baton Rouge, La.

[73] Assignee: Ethyl Corporation, Richmond, Va.

[21] Appl. No.: 228,276

[22] Filed: Jan. 26, 1981

Related U.S. Application Data

[62] Division of Ser. No. 71,301, Aug. 30, 1979, Pat. No. 4,280,805.

[51] Int. Cl.$^3$ .............................................. B29C 17/07
[52] U.S. Cl. .................................... 264/532; 264/537
[58] Field of Search ............... 264/537, 538, 523, 532; 425/522, 525, 533, 534, 526

[56] References Cited

U.S. PATENT DOCUMENTS

| | | | |
|---|---|---|---|
| 3,172,929 | 3/1965 | Santelli | 264/537 |
| 3,850,562 | 11/1974 | Takeuchi et al. | 425/525 |
| 4,280,859 | 7/1981 | Thompson | 264/540 X |

FOREIGN PATENT DOCUMENTS 154343 11/1953 Australia .............................. 425/525

*Primary Examiner*—Jan H. Silbaugh
*Attorney, Agent, or Firm*—Donald L. Johnson; John F. Sieberth; Edgar E. Spielman, Jr.

[57] ABSTRACT

A process and multistation apparatus for injection blow molding a thermoplastic material to form a blow molded container having an integral injection molded handle is disclosed. The process and apparatus feature an injection mold which is closed to form an injection mold cavity with a contiguous injection mold handle cavity. A preform pin is inserted into the injection mold cavity through a preform carrier to form a preform recess into which hot thermoplastic is injected to form a hollow preform having a solid injection molded handle. After cooling the thermoplastic preform the preform pin is withdrawn and the molds are opened. The injection formed preform may be optionally heat treated prior to the preform being enclosed within a blow mold. The blow mold forms a cavity having the final desired container shape and a cavity into which the handle is enclosed. Blow air is introduced into the preform to inflate it to the shape of the blow mold cavity thereby forming a blow molded container having an injection molded handle attached thereto. A preform carrier may be used to carry the injection molded preform from the injection mold station to the blow mold station. The carrier attains attachment to the preform as the preform is formed in the injection mold.

3 Claims, 22 Drawing Figures

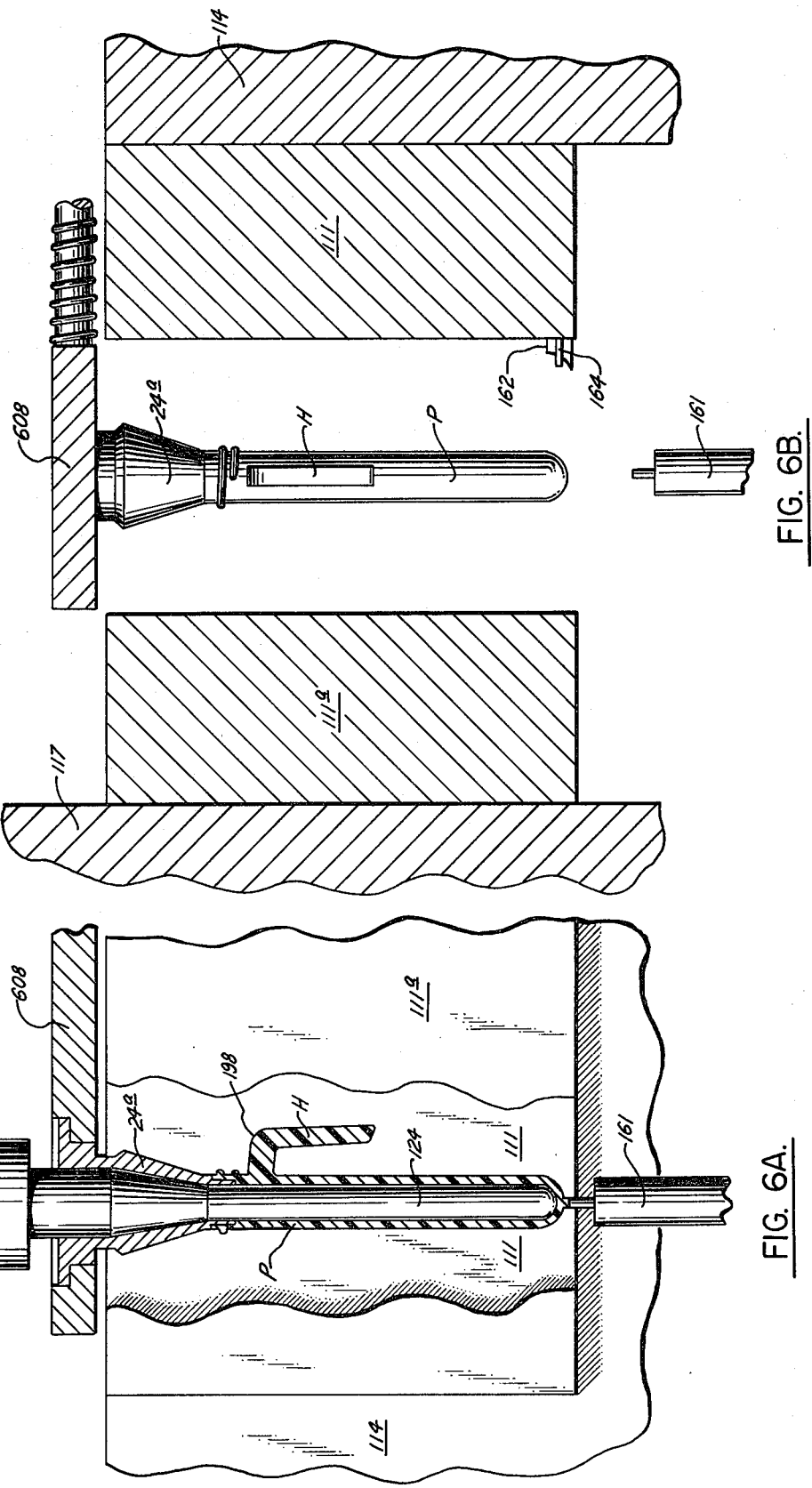

INJECTION BLOW MOLDING PROCESS

This is a division of application Ser. No. 71,301, filed Aug. 30, 1979, now U.S. Pat. No. 4,280,805.

BACKGROUND OF THE INVENTION

The popularity of blow molded handleware has grown in recent years as consumers begin to appreciate the ease of use and the non-breakable characteristics of such containers. Handled containers are especially popular in the larger sizes, i.e. containers having a capacity of one quart or greater. Exemplary of products which are often packaged in handleware are starch, bleach, detergent, milk, distilled water, etc.

In the past a class of blow molding machines known as the "inject, extrude and blow" machines have been adapted to blow mold handled containers of large size. In these machines the neck, or finish, of the container is injection molded in an injection mold superimposed on an annular orifice. After the mold is filled from the orifice, the mold is moved away from the orifice as the tube integral with the material filling the mold is extruded through the orifice. The blow mold is then closed between the tube and the neck mold of the orifice pinching the tube shut near the orifice. Blow air is then injected through the neck mold into the tube, and the tube is simply inflated to the configuration of the blow mold. In early attempts to adopt such injection, extrude and blow machines for the manufacture of handled containers, it was found nearly impossible to extrude a tube having both an integral injection finish and a diameter sufficient to provide material properly located in the parison to be pinched shut by the blow mold to form an integral handle upon blowing. This early attempt at forming handleware resulted in the production of much waste material, i.e. flash, which was principally found on the interior and exterior of the handle. Other problems were also recognized, such as uneven material distribution and pin holes in the handle.

Further refinements were made on the inject, extrude and blow process which were claimed to reduce the amount of flash produced and to also provide a container having uniform material distribution. By reducing the amount of flash which must be trimmed from the container, leaks in the container are said to be avoided. Exemplary of these newer machines is the one disclosed in U.S. Pat. No. 3,944,642.

In the newer version the tubular parison integral with the injection molded finish portion of the container is formed in a conventional manner as set forth in U.S. Pat. No. 3,008,192. The preform is then preblown in an intermediate blow mold which has a similar but smaller shape than the final blow mold. The preblow preform has a portion which is of a configuration such that the preform portion which will form the handle will be encompassed within the handle defining portions of the final blow mold. Once the preblown preform is positioned within the final blow mold the preform is blown to its final shape. Even though this machine and process produces a handled container which is free of external flash, there is still produced flash which is in the interior of the handle, i.e. in the space encompassed between the handle and the container.

Handleware may be produced without concurrent production of flash by the apparatus disclosed in U.S. Pat. No. 3,029,471. This apparatus injection forms the handle followed by formation of an extruded tube which is integral with the handle. The tube is extruded to a sufficient length to fill the axial length of an adjacent split blow mold. The split blow mold is closed to capture that portion of the extruded tube beneath the injection molded handle so that that portion of the tube may be inflated to form the container. Since the apparatus passes the molten thermoplastic material through a single orifice for both the injection and extrusion steps, a highly complex timing and mechanical system must be used. Furthermore, temperature control of the injection finish with respect to the extruded tube will be difficult to handle at best.

Therefore it is an object of this invention to provide a process and apparatus for forming handleware which is free of undesirable flash formation and which is the paragon of simplicity.

It is a further object of this invention to provide an apparatus and process which is capable not only of forming flashless handleware, but which is also capable of forming biaxially oriented handleware.

THE INVENTION

A multistation apparatus for injection blow molding a thermoplastic material to form a blow molded container having an integral injection molded handle, said apparatus comprising: an injection molding station, for forming a plastic preform having an integral handle thereon, the molding station including, (i) a split injection mold defining a preform cavity with a contiguous injection molded handle cavity, an injection mold carrier cavity, and an injection nozzle cavity, the preform cavity being between the injection mold cavity and the nozzle cavity, (ii) power means engaged with the split injection mold for opening and closing the split injection mold, (iii) a movable preform pin, (iv) an injection nozzle which nests into the injection nozzle cavity when the split injection mold is closed, and (v) injection power means for injecting, under pressure, thermoplastic material through the injection nozzle to a preform recess formed at least partially by said injection mold handle cavity and by the preform pin being positioned within the preform cavity; a blow molding station having, (i) a split blow mold defining a blow mold cavity with a contiguous blow mold handle cavity and a blow mold carrier cavity, (ii) power means engaged with the split blow mold for opening and closing the split blow mold, and (iii) a movable blow pin, the blow pin supplying pressurized gas to inflate the preform; moving means for moving a preform carrier from station to station, the preform carrier having a portion to achieve attachment of the preform to the preform carrier when the preform is formed by the injection of thermoplastic material in the preform recess and having another portion which is in mounted relationship with the moving means at the time the attachment is achieved, and the preform carrier being (i) receivable into the injection mold carrier cavity and the blow mold carrier cavity, and (ii) hollow to allow passage through the preform carrier of the preform pin and to allow nesting of the blow pin in the preform carrier.

Optionally there may be provided heat treating stations between the injection molding station and the blow molding station. These heat treating stations would be utilized to either raise, lower or maintain the temperature of the preform as it moves from the injection molding station to the blow molding station. The heat treating stations can also be utilized to selectively heat or cool a specific portion of the preform to provide a heat programmed preform to the blow molding station.

Since the preform is rigidly held by the moving apparatus as it is moved from the injection molding station through the heat treatment stations to the blow mold station, the exact location of any point on the preform is known. Locating the injection formed handle within the blow mold handle cavity is therefore easily achieved.

The apparatus of this invention is also highly advantageous in that it is readily adaptable for producing biaxially oriented containers. When biaxial orientation is desired the optional heat treating stations are used to maintain or bring the injection molded preform to its biaxial orientation temperature and the blow molding station is provided with a means for biaxially orienting the container with longitudinal and radial stretch.

To increase cycle speed and to provide economy in manufacture, the apparatus of this invention may also be provided with an ejection system for removing the formed container from the moving apparatus. Such a system would be located subsequent to the blow molding step and prior to the injection molding step.

These and other features of this invention contributing satisfaction in use and economy in manufacture will be more fully understood from the following description of a preferred embodiment of this invention when taken in connection with the accompanying drawings wherein identical numerals refer to identical parts and in which:

FIG. 6A is a broken away front view of the split injection mold shown in FIG. 2;

FIG. 6B is a side view of the split injection mold shown in FIG. 2;

Figure 1:
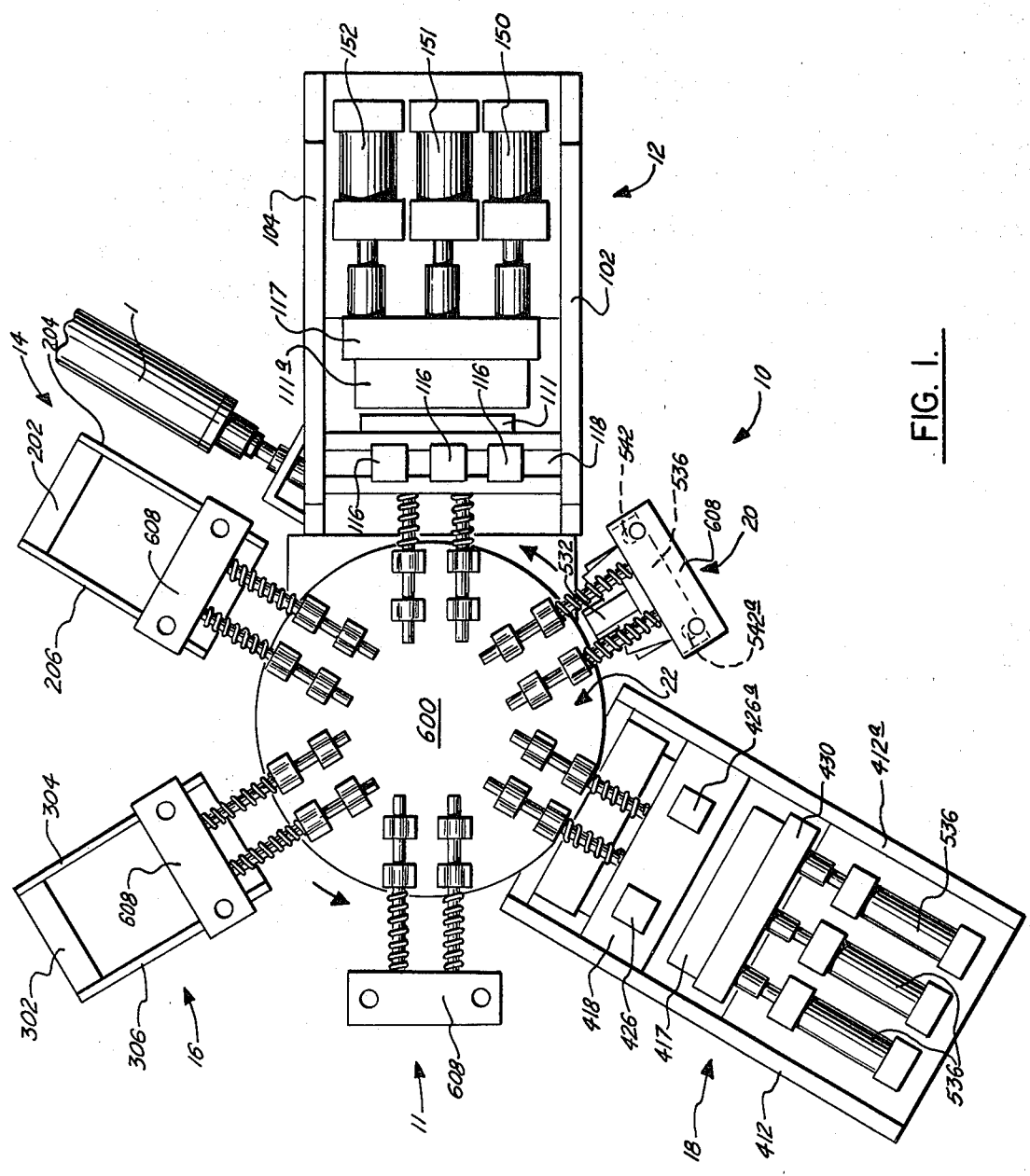
FIG. 1 is a top plan view of an embodiment of this invention.

Referring now to FIG. 1, there is shown an apparatus of this invention generally designated by the numeral 10 which apparatus includes an injection molding station, generally designated by the numeral 12, a first heating station, generally designated by the numeral 14, a second heating station, generally designated by the numeral 16, a blow molding station generally designated by the numeral 18, and an ejection or removal station, generally designated by the numeral 20. These various stations are positioned around a moving apparatus generally designated by the numeral 22 which includes a rotating table 600 and an attaching mechanism, generally designated by the numeral 11 for holding the injection formed preform as it moves through the various stations. The utilization of the first and second heating stations 14 and 16 are optional. In some instances it may be desired that instead of two heating stations, a heating and cooling station be utilized in combination. Depending upon the particular thermoplastic material being worked and upon the requirements needed for the blow molding of this material, it may be desirable not to utilize any heat treatment stations which use positive heat addition or removal. In these instances the preform would be subject only to ambient air. The particular combination of heat treatment stations, or the lack of them, is fully within the discretion of the user of the apparatus of this invention and the addition or deletion of such stations would not materially affect the operation of this apparatus.

Figure 15:
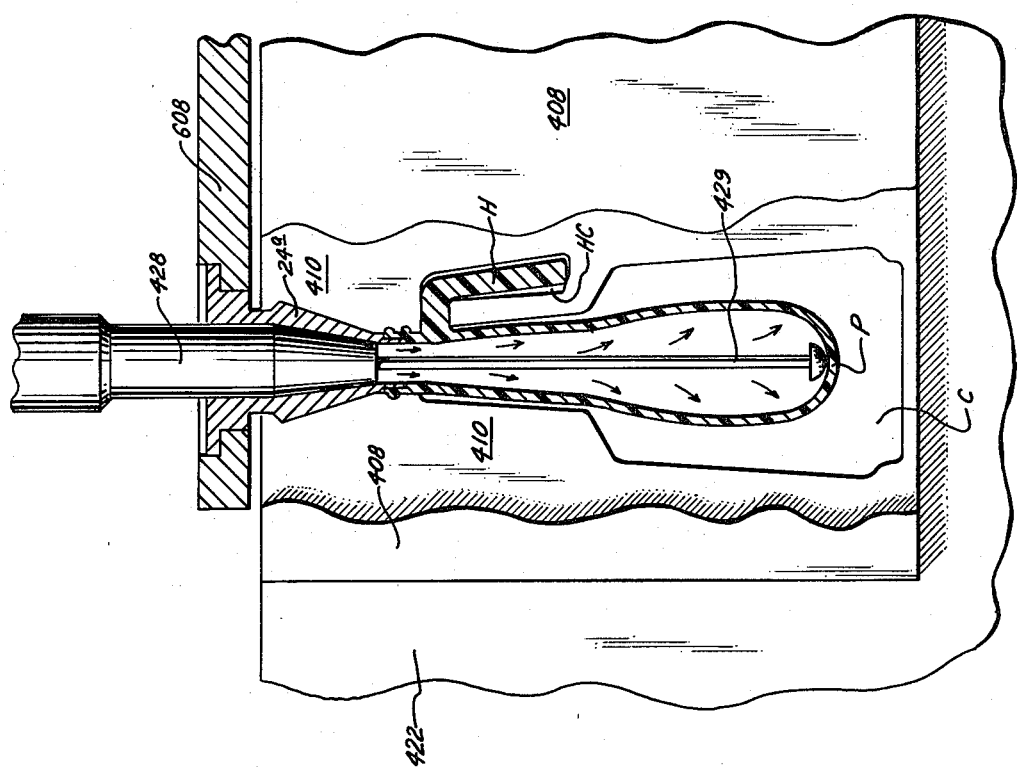
FIGS. 14-16 are front partial sectional views taken through the center axis of split blow mold shown in FIG. 12.
Figure 14:
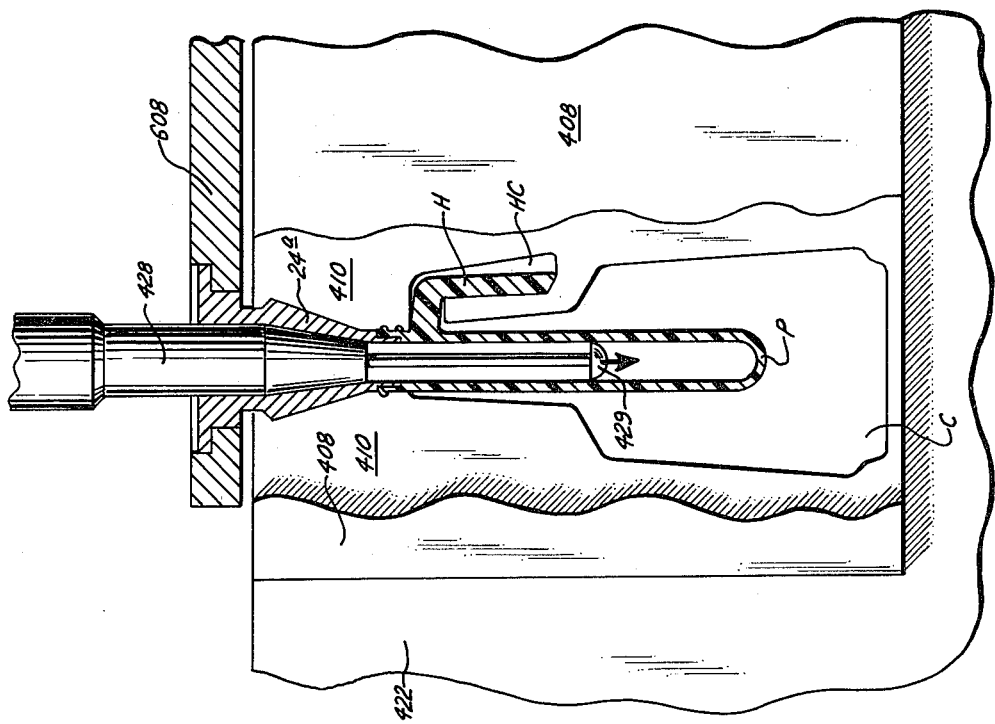
Figure 16:
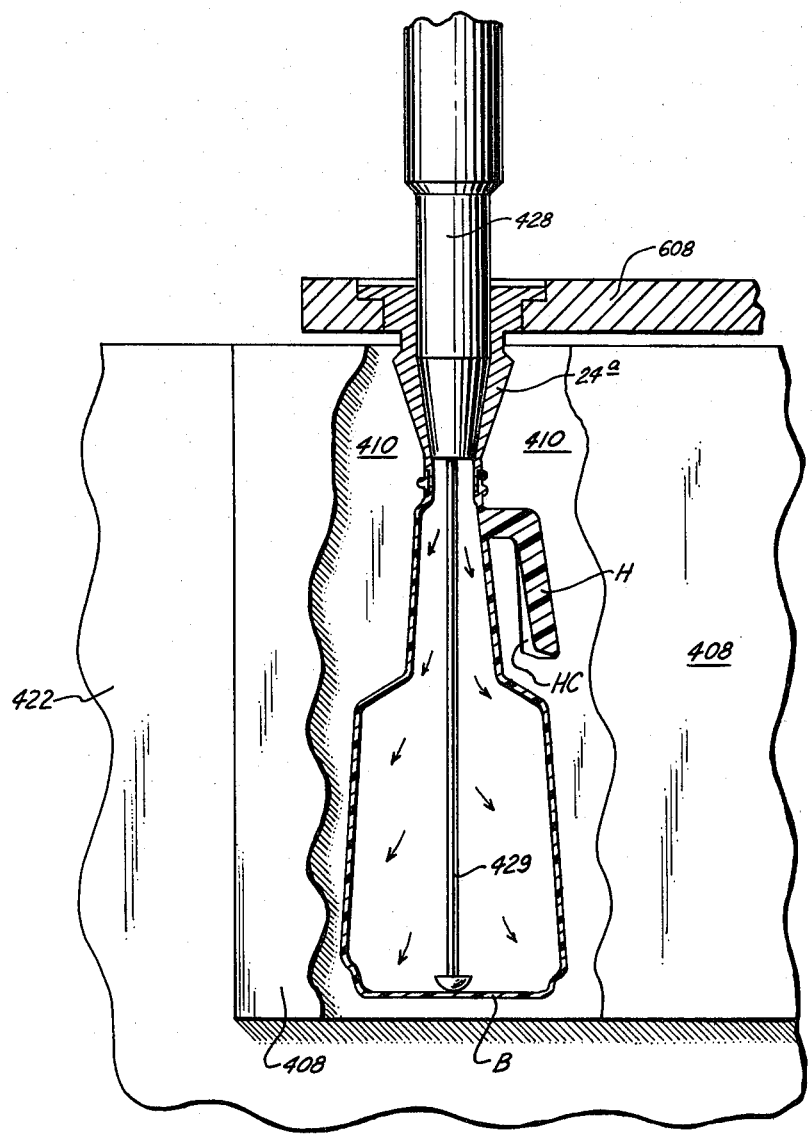

Blow molding station 18, for the apparatus in the drawings, can be used for the formation of biaxially oriented containers. As shown in FIGS. 14-16, a push rod may be utilized to guide the preform as it is blown to achieve simultaneous axial and radial stretch. It is to be understood that the blow molding station may also provide conventional blow molding without the utilization of a stretch rod.

Figure 2:
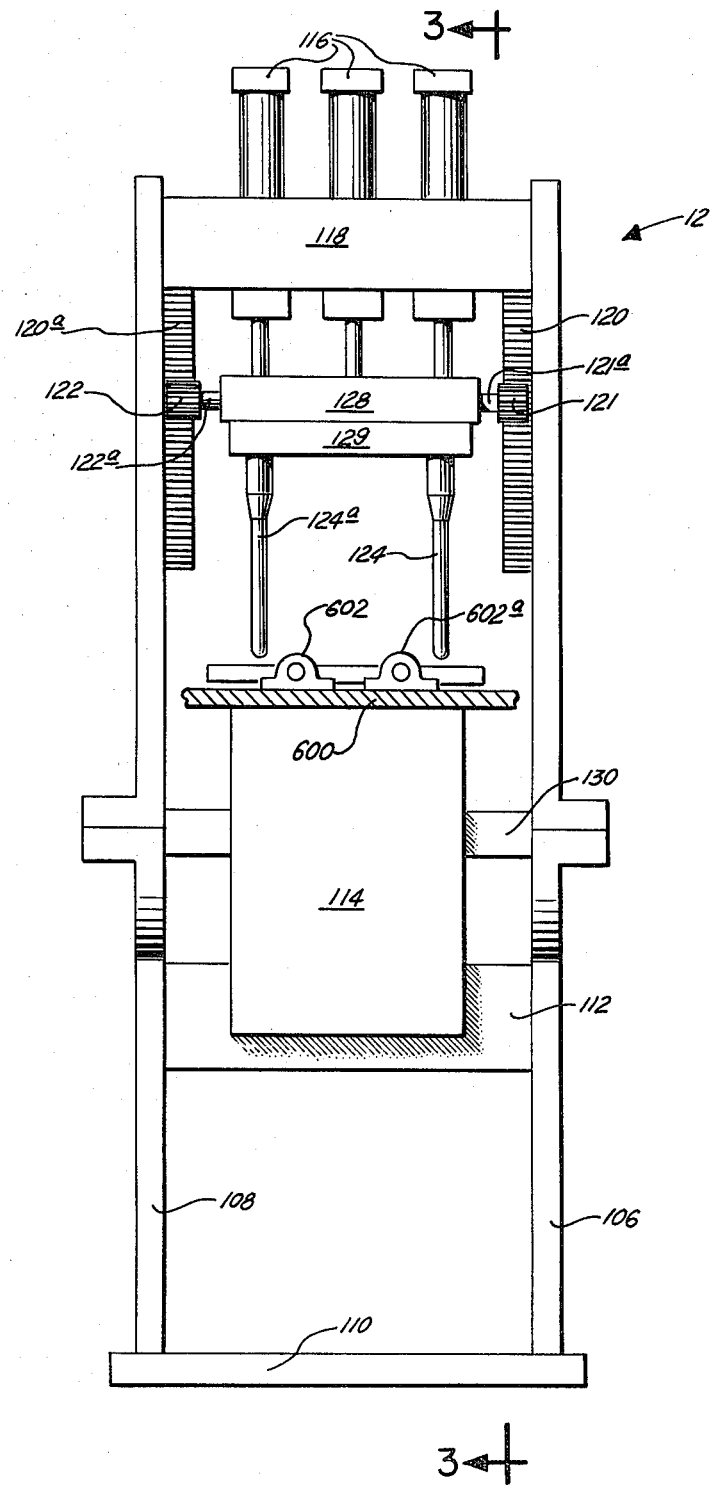
FIG. 2 is a front elevational view of the injection molding station shown in FIG. 1.
Figure 3:
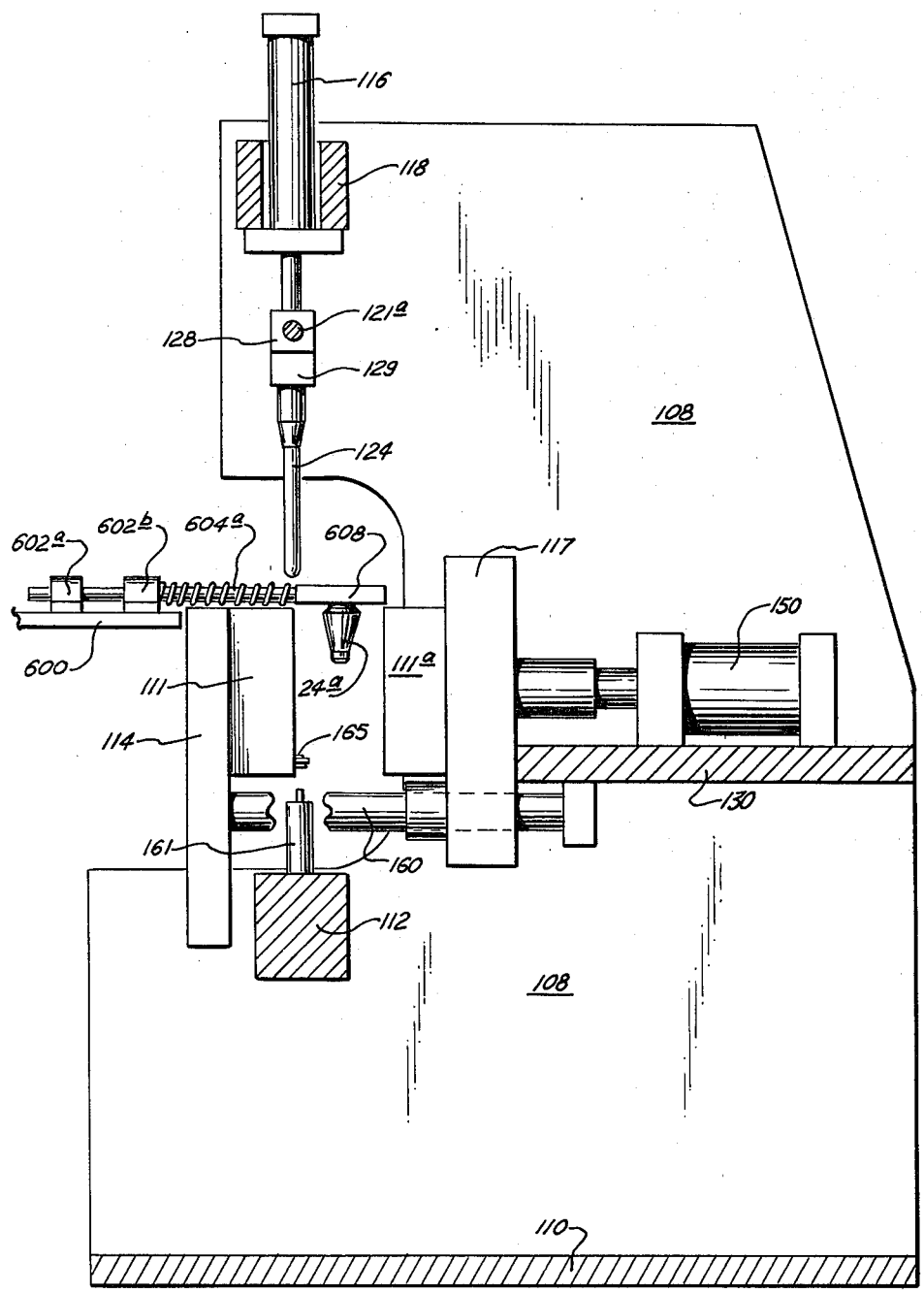
FIG. 3 is a sectional view taken through section lines 3—3 of FIG. 2.

The injection molding station 12 is shown in FIGS. 2 and 3. As can be seen from these figures, injection station 12 has a frame which includes a floor plate 110 and injection molding side plates 108 and 106. Connecting injection molding side plates 108 and 106 at a point near their mid height is horizontal tying plate 130. At the upper end of injection molding side plates 108 and 106 there are a pair of upper tying plates 118 which provide tying of plates 108 and 106 together at that point.

The split injection mold is defined by complementary cavities in the injection split mold halves 111 and 111a. The embodiment illustrated has an injection split mold which defines two preform cavities. It is to be understood however, that single cavity operations or operations involving more than two cavities are possible with the apparatus of this invention. To produce the handleware of this invention the split injection molds have a cavity defining a main body portion, i.e. preform cavity, and a handle portion as seen in FIG. 6A. Preform pin 124 fits within the preform cavity to produce a closed end hollow preform. The handle cavity is injection filled with thermoplastic material to produce the handle which is designated "H" in the drawings.

Injection split mold halves 111 and 111a are mounted, respectively, on plates 114 and 117. Platen 114 is a nonmoving platen with platen 117 being movable in a horizontal direction. Movement is achieved by the utilization of a bank of hydraulic cylinders 150, 151, and 152 which are shown in FIG. 1. These hydraulic cylinders are mounted to horizontal tying plate 130. To insure aligned movement of platen 117 in the horizontal direction there is provided a plurality of guide rods. One of these guide rods is shown in FIG. 3 and is labeled with the number 160. Guide rod 160 is typical of the other guide rods utilized and the description of it would apply to the other guide rods utilized. Guide rod 160 is rigidly attached to platen 114 at one of its ends and to stud 169 at its other end with stud 169 in turn being attached to the underside of horizontal tying plate 130. Note, as is shown in FIG. 3, guide rod 160 passes through an aperture in platen 117. The fit of guide rod 160 through this aperture must be, of course, exact to insure fidelity of movement of platen 117.

Positioned immediately below injection split mold halves 111 and 111a and centered to the two preform cavities are two injection nozzles, one for each cavity. Only one of these nozzles is shown in the drawings, however a description of it is equally applicable to the other. Injection nozzle 161 is positioned so that it enters into an injection nozzle cavity provided in injection split mold halves 111 and 111a. Upward and downward movement of injection nozzle 161 is provided so that it may move upward into the injection nozzle cavity and may move downward away from the cavity. Injection nozzle 161 is mounted to tying beam 112. Note that in FIG. 1 the injection apparatus utilized to inject the plastic through the injection nozzle is positioned adjacent to injection molding station 12 and is labeled "I." The position and construction of apparatus "I" is discretionary with the user of the apparatus of this invention, it being understood that any apparatus which is capable of injecting hot thermoplastic material under pressure through the injection nozzles into the injection mold preform recesses, hereinafter described, will be suitable for the purposes of this invention. Immediately above injection split mold halves 111 and 111a there is positioned a pair of preform pins 124 and 124a. Preform pins 124 and 124a are mounted rigidly to preform mounting stud 129. Preform mounting stud 129 can be bolted to block 128 so that easy replacement of preform pins 124 and 124a can be achieved by the mere unbolting of stud 129 from block 128. On the upper surface of block 128 there are attached three double acting hydraulic cylinders 116. These cylinders will provide upward and downward motion to pins 124 and 124a so that they may enter the split injection mold and be removed therefrom when desired. To insure perfect alignment of preform pins 124 and 124a within split injection molds during the movement provided by hydraulic cylinders 116 there is provided a pair of gear tracks 120 and 120a which are connected to injection molding side plates 108 and 106, respectively. These gear tracks cooperate with circular gears 122 and 121 to provide positive movement and thus assure correct alignment. Circular gears 122 and 121 are rotatively mounted to gear axles 122a and 121a, which are in turn carried by block 128.

Figure 5:
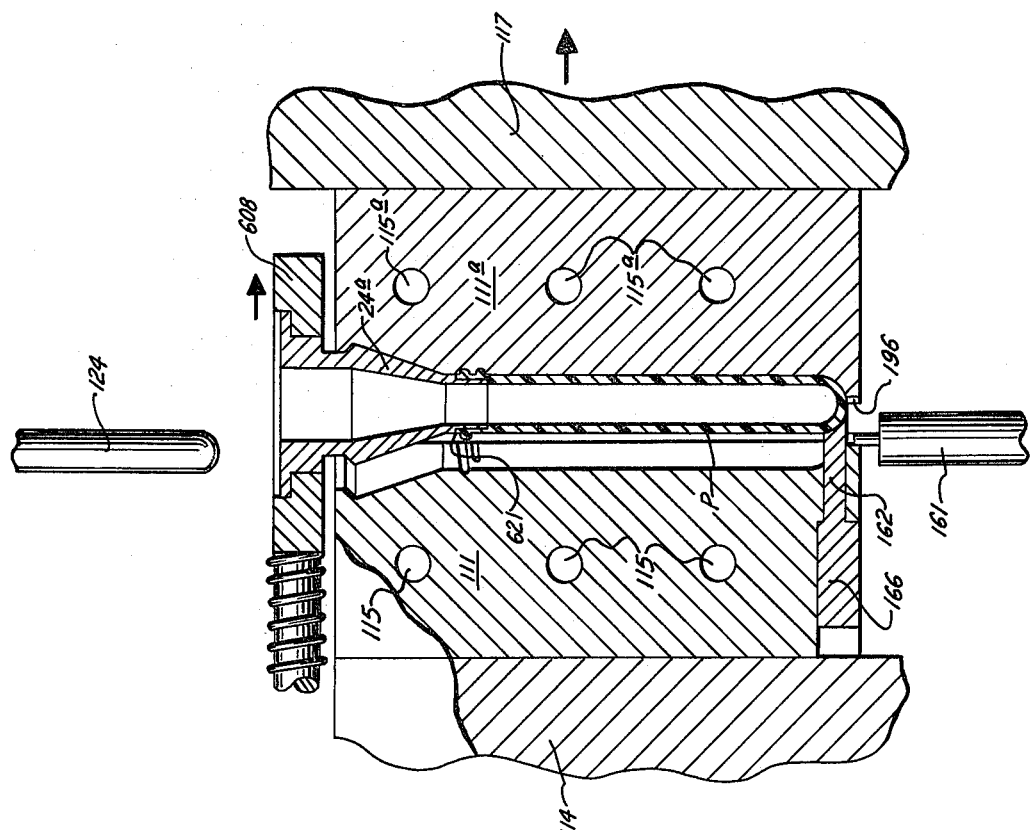
FIGS. 4-6 are side partial sectional views taken through the center line of the split injection mold shown in FIG. 2.
Figure 7:
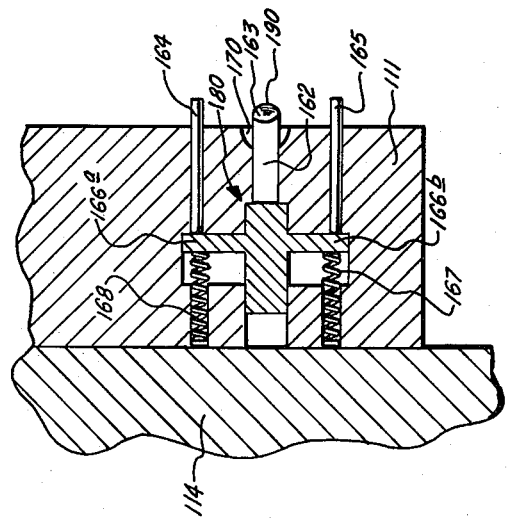
FIG. 7 is a sectional view taken through section lines 7—7 of FIG. 6.
Figure 6:
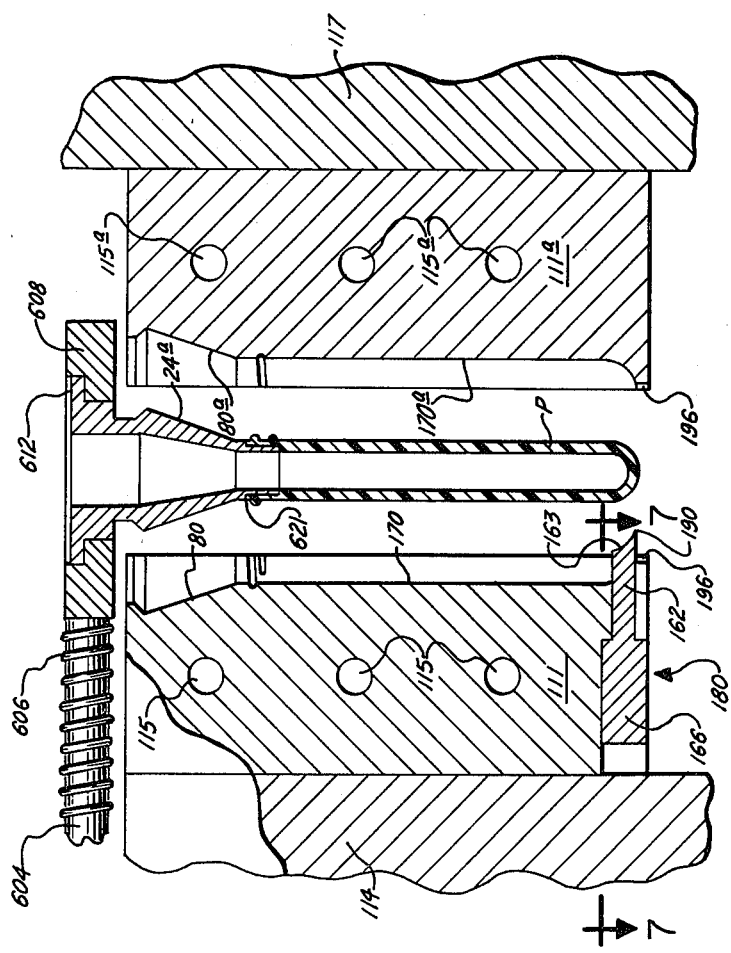
Figure 7A:
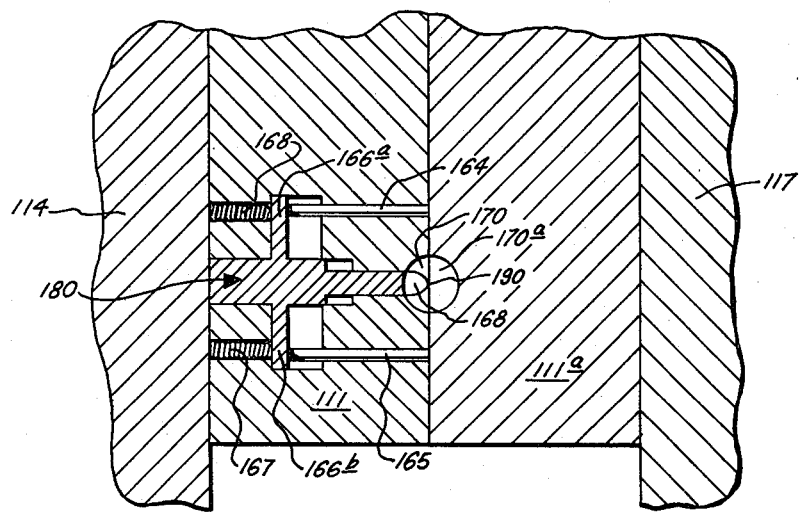
FIG. 7A is a sectional view taken through section lines 7a—7a of FIG. 4.

Located adjacent the bottom of the injection split mold half 111 are two mechanisms for severing the injection tails from each of the preforms formed in the two preform cavities. These mechanisms are optional and may not be used in those cases where the downward movement of the injection nozzle breaks the tail from the preforms. The severing mechanisms are identical and the description of one is equally applicable to the other. In FIGS. 6, 7 and 7A there is shown a severing mechanism generally designated by the numeral 180. As can be seen, this mechanism fits within a recess cut into the bottom of split injection mold 111. Severing mechanism 180 has a block portion 166 with arms 166a and 166b. Mounted on the outside surfaces of arms 166a and 166b are push rods 165 and 164, respectively. Positioned on the rear surface of arms 166a and 166b are springs 167 and 168, respectively. Knife 162 is mounted on the front side of block 166 and as can be seen in FIGS. 6 and 7A, knife 162 has a cupped surface 163 which is contoured so that it forms a portion of the injection mold cavity in injection split mold half 111. The leading edge of cupped surface 163 is a knife edge 190 which is sharpened to achieve the severing of the injection tail. In FIG. 7A severing mechanism 180 is shown in the retracted position with cupped surface 163 forming a portion of the cavity in injection split mold half 111. In FIG. 7 severance mechanism 180 is shown in the extended position. As can be appreciated, knife edge 190 has travelled a path which will enable it to sever a tail formed in the injection nozzle cavity. This severing action is depicted in FIG. 5 wherein severing mechanism 180 is in the extended position.

As mentioned previously, injection molding station 12 is positioned around moving apparatus 22. Moving apparatus 22 includes a rotating table 600 and a plurality of attaching mechanisms 11 which are spaced equiangularly about table 600. For the embodiment shown, table 600 rotates in a counter-clockwise direction. Rotation is an interrupted movement with the table stopping rotation when the preform or bottle is registered before a station. Interrupted rotation is provided by any one of the many well-known commercial conventional systems.

Figure 19:
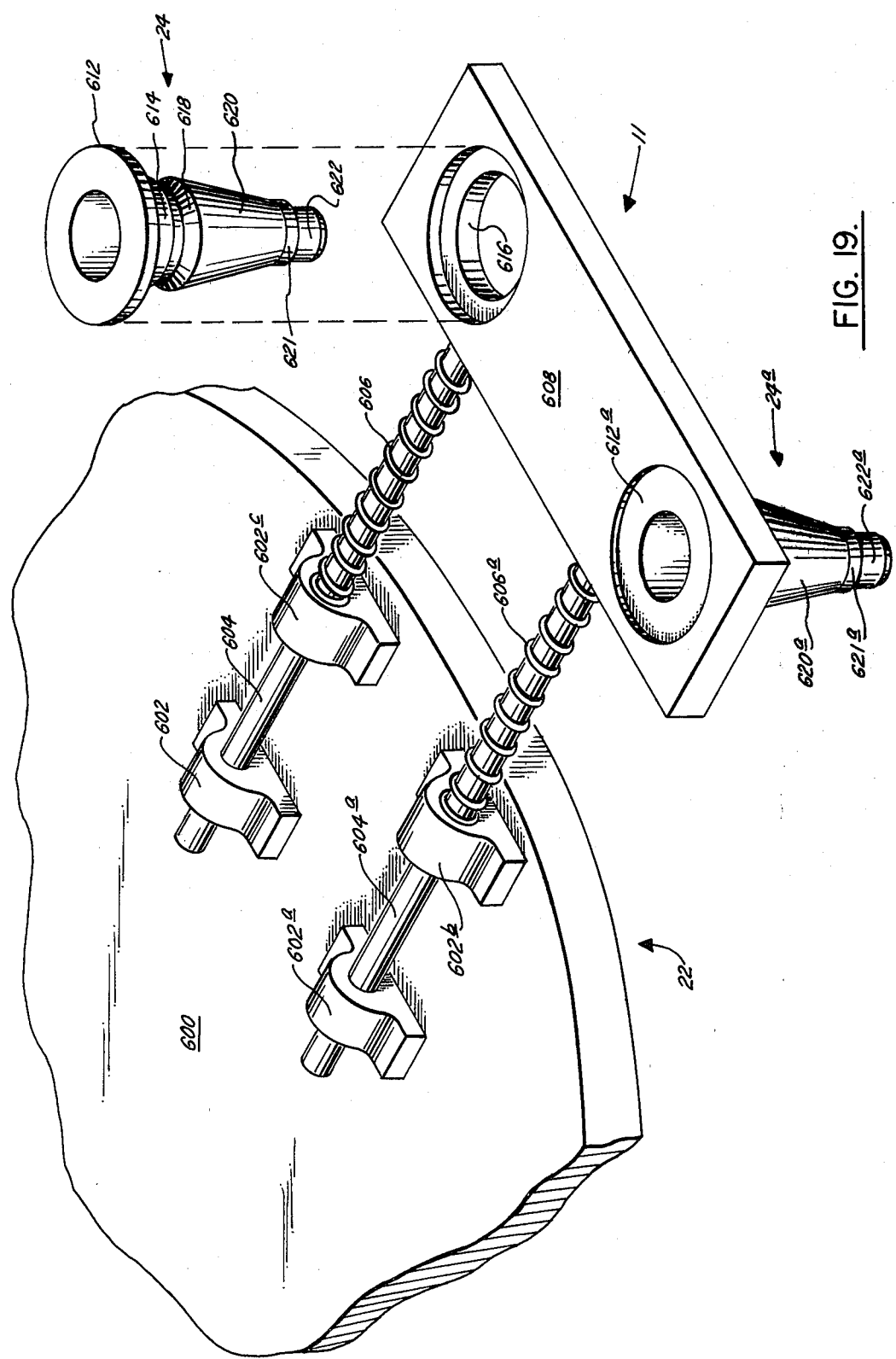
FIG. 19 is a perspective view of a portion of the moving means shown in FIG. 1 and the attaching mechanism shown in FIG. 1.

The attaching mechanism is attached to the injection molded preform as it is formed at the injection molding station 12. The mechanism then carries same to subsequent stations until the final blown article is removed from mechanism 11 at the ejection or removal station 20. The attaching mechanisms 11 shown in FIGS. 1 and 19 are especially adapted for utilization with the illustrated embodiment of this invention. It is to be understood that other attaching mechanisms may be utilized to accommodate the peculiarities of other systems of this invention. It is also obvious that while a rotating table may have advantages with respect to conserving floor space, other moving apparatuses may be used having different configurations. For example, the moving apparatus may provide linear movement of the attaching mechanisms with the various stations positioned adjacent thereto in a line.

Reference is directed to FIG. 19 wherein a detail blowup of one of the attaching mechanisms is depicted. Since all of the attaching mechanisms are essentially identical, a description of any one mechanism is equally applicable to all.

As is shown in FIG. 19, attaching mechanism 11 is movably mounted to table 600 by means of left mounts 602a and 602b and right mounts 602 and 602c. Movably held by these mounts are attaching mechanism rods 604 and 604a. At the proximate ends of these rods there are rod stops (not shown) to limit the outward travel of the rods. At the distal end of rods 604a and 604 there is attached thereto plate 608. Between plate 608 and mounts 602b and 602c there is provided, around the rods, springs 606a and 606 which urge the rods, with attached plate 608, in a direction outward from the center of table 600.

Figure 4:
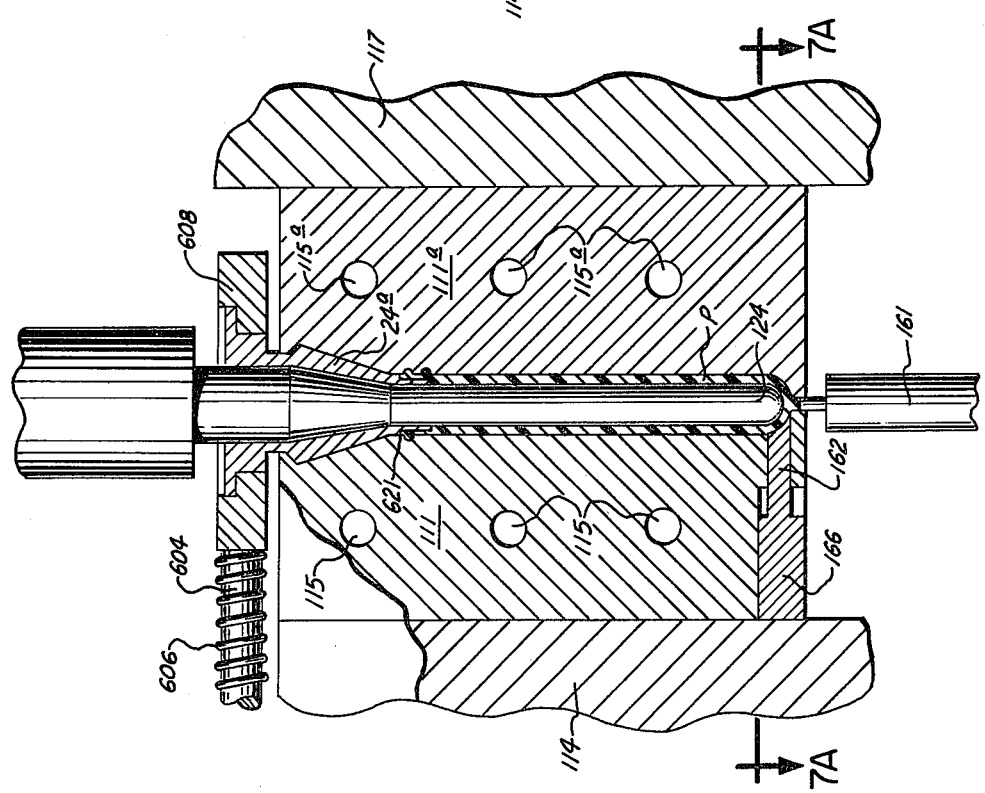

Plate 608 has a pair of open-ended pockets for receipt of a pair of mandrels 24 and 24a to which the preforms are held as they travel from the injection molding station to the remaining stations. In FIG. 19 one of the two identical pockets is shown and a description of it is equally applicable to the other pocket. The exposed pocket in FIG. 19 is shown to have a circular aperture therethrough defined by annular sidewall 616. Immediately above annular sidewall 616 is landing area 610 which is dimensioned to receive flange portion 612 of mandrel 24. Assuring further that there is no excess wobble of mandrel 24 within its pocket there is provided annular mandrel wall 614 which is dimensioned to nest within the aperture defined by annular sidewall 616. Below annular mandrel wall 614 there is provided a pair of intersecting beveled surfaces 618 and 620. These surfaces resemble two truncated cones which intersect at their bases and are received in complementary beveled cavities found in the injection split mold and the blow split mold as hereinafter described. By utilizing beveled surfaces 618 and 620, fidelity of positioning within the injection and blow mold cavities is achieved when the injection split molds and the blow split molds close around a portion of mandrel 24. With the mandrels captured in the injection split mold, as shown in FIG. 4, each mandrel has an annular downward facing surface 621 which will form the uppermost boundary of the recess into which the thermoplastic material is to be injected when the preform pins are in place. Immediately below surface 621 is a mandrel end piece 622 which will hold the injection formed preform at its neck subsequent to the injection molding operation. Another function served by surface 621 is that it, in combination with the preform pin, forms the inside boundary of the injection mold recess.

The mandrels described above are ones which have been found to be highly preferred. They also reflect the finding that it is highly preferential to carry the injection formed preform by its neck as it moves from station to station. However, other mandrels having different designs which accomplish the same function as the above-described mandrels may, of course, be utilized. Furthermore, it may be desirable, in some cases, for the preform to be carried at a point other than at a point adjacent to the neck portion. For example, a mandrel could be used whereby the preform is carried at a point near its midsection. Also it should be realized that while the mandrels described above carry the preform by making contact with it on its inside surfaces, it is fully within the scope of this invention to utilize mandrels which carry the preform by making contact on the preform outside surfaces. For the embodiment shown, the preform is held to the mandrel due to the preform contracting around the mandrel and piece 621 as the preform cools. In those cases where the mandrel would capture the preform at a point on the preform's outerside surfaces, it would be desirable to utilize an interference fit to hold the preform to the mandrel.

The operation of the injection molding station 12 is initiated with the injection split mold in the open position as is shown in FIG. 3. Table 600 rotates and stops so that the mandrels 24 and 24a are positioned for receipt by the injection split mold when it closes, as is shown in FIG. 4. As injection split mold half 111a moves to close the split mold it will press against a portion of the beveled surface of mandrel 24 and 24a urging attaching mechanism 11 towards the center of table 600. Also as mold half 111a closes, it presses against push rods 164 and 165 thereby retracting severing mechanism 180. The position of severing mechanism 180 in the retracted position is shown in FIG. 7A. After injection split mold half 111a has completed its travel then the preform pins 124 and 124a are lowered through mandrels 24 and 24a and down into the preform cavity formed by the injection split molds, cupped surface 161 and annular downward facing surface 621. Note that the beveled surfaces of mandrels 24a are nested into the complementary beveled cavities 80 and 80a which are so labeled in FIG. 6. This nesting, as noted before, is to insure correct registration of the mandrel with respect to the injection split mold cavity formed by the injection split mold halves. FIG. 4 shows the injection split molds in the closed position with the preform pins positioned in the cavity and the injection nozzle cavity 196 (FIG. 5) enclosing nozzle 161. Plastic is injected through the injection nozzle into the recess formed by the injection mold cavities, cupped surface 163, the preform pin and the annular downward facing surface 621. Plastic will also enter injection mold handle cavity 198 shown filled with plastic in FIG. 6A. From FIG. 6A it is seen that the plastic flows from the recess to fill handle cavity 198. Subsequent to the injection of the hot thermoplastic material into the recess and handle cavity, cooling fluid is passed through cooling traces 115 and 115a to cool the mold and thus chill the plastic. After the plastic has chilled sufficiently the preform pins 124 and 124a are removed from the preform. To conserve cycle time, the preform pins are withdrawn from the preform when the preform has reached a temperature that renders the preform rigid enough to prevent deformation as the pins are removed. Also by pulling the pins without waiting for further cooling, an energy saving is realized as the preform does not have to be heated back up to its blow molding or biaxial orientation temperature as the case may be. After the preform pins have been removed injection split mold half 111a is retracted. Follower rods 164 and 165, due to the urging of follower rod springs 168 and 167, follow mold half 111a as it opens. This results in knife edge 190 moving across the injection mold tail to sever it from preform "P." This severing operation is depicted in FIG. 5. As injection split mold half 111a moves, attaching mechanism 111 will follow for a part of the total travel of the mold half. FIG. 5 shows this movement. The advantage gained by having attaching mechanism 11 move outwardly is that the preform will be spaced sufficiently far enough from the split mold halves so it can be rotated from the injection molding station 12 without interference being encountered. Distance from split mold half 111a is achieved as the travel of attaching mechanism 11 is stopped by rod stops while split mold half 111a continues to travel. Since preform "P" is rigidly held by mandrel 24a as it moves from station to station every point on preform "P" is easily determined at the subsequent stations. By having the ability to determine the exact location of every point on the preform it will be possible to perform very exact heat programming techniques on the preform which techniques would not be possible if the preform moved with respect to the moving apparatus.

Depending upon the temperature of the preform as it leaves the injection molding station, the preform may either be sent immediately to the blow molding station or to heat conditioning stations for treatment prior to reaching the blow molding station. If the preform is at a temperature above the desired temperature for the blowing procedure then the preform can first be sent to a heat conditioning station in which the preform is cooled to the proper temperature. The converse is true if the preform is to cool. Also the preform can be heat programmed at the heat conditioning station. When heat programming is utilized, one portion of the preform will be heated or cooled to a different extent than other portions of the preform. By having differences in heat content throughout the preform it is possible to control the extent and rate of stretch at the blow molding station. As before mentioned, since the preforms are held rigidly by the mandrels 24 and 24a it is possible, at the heat treating stations, to apply heat or apply cooling to any desired point on the preform with complete assurance that this particular point will be in perfect orientation when it reaches the blow mold station.

Figure 10:
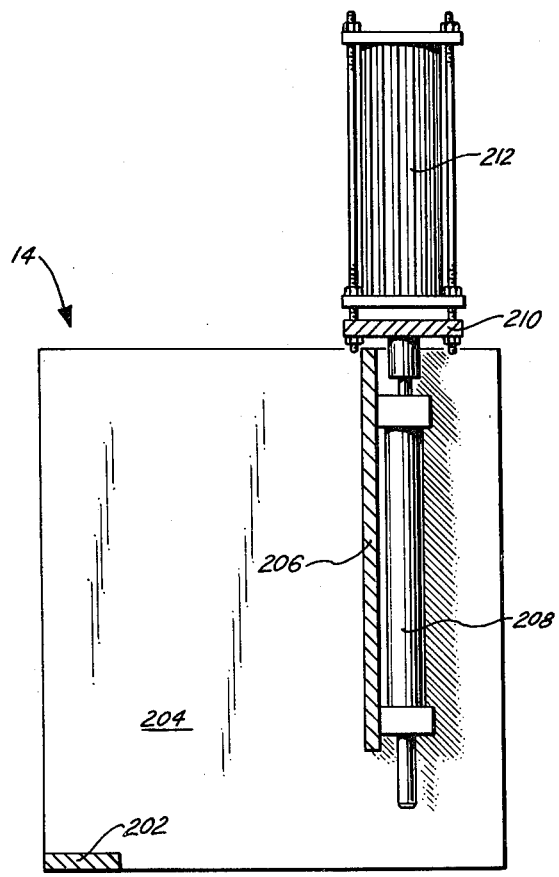
FIG. 10 is a sectional view taken through section lines 10—10 of FIG. 8.
Figure 9:
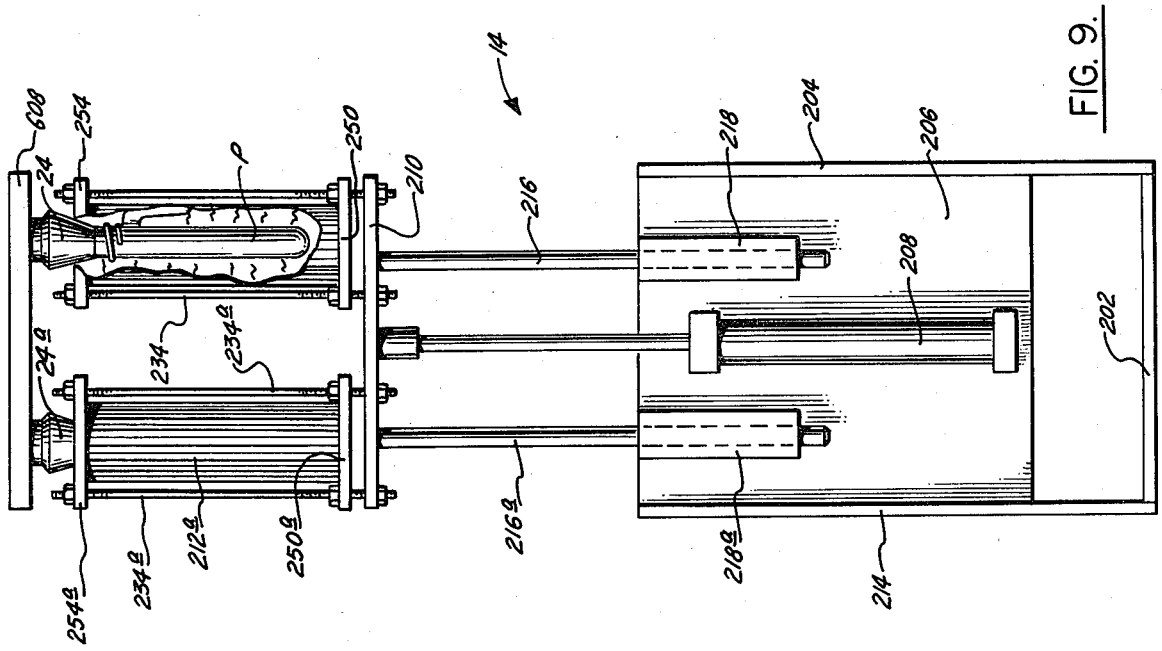
FIG. 9 is a front elevational view of the heating station shown in FIG. 8 in the up position.
Figure 8:
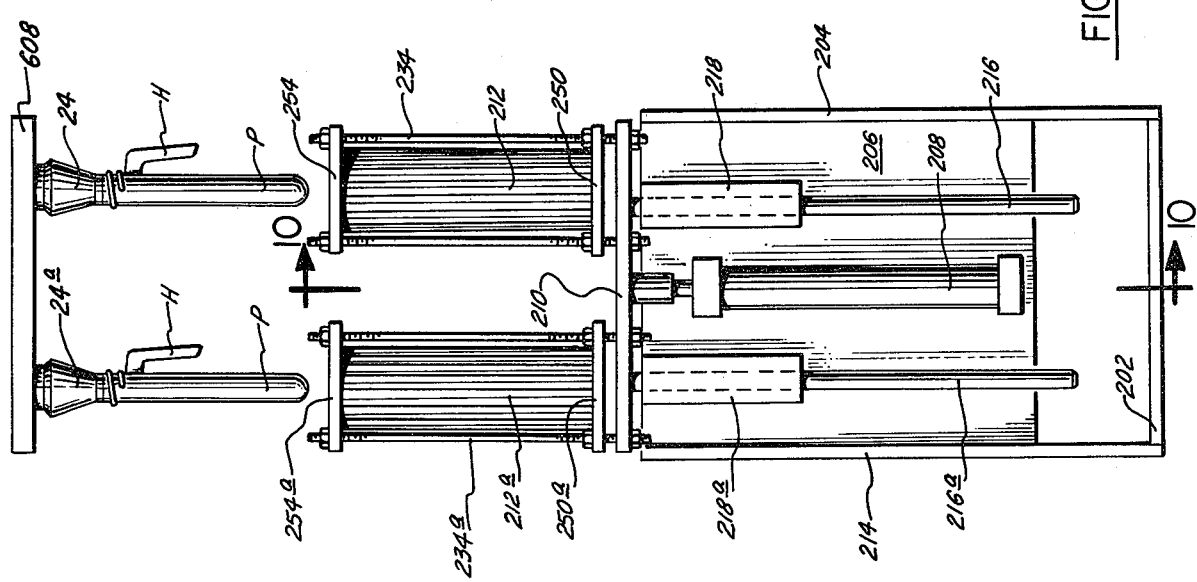
FIG. 8 is a front elevational view of one of the heating stations shown in FIG. 1 with the heating station in the down position.

In FIGS. 8–10 there is shown a heating station of this invention, generally designated by the numeral 14. Heating station 14 has side plates 204 and 214 which are tied together at their bottom by tying bar 202. Also connecting side plates 204 and 214 is mounting plate 206. Mounting plate 206 has attached to its front face double acting hydraulic cylinder 208 which is connected to heating element pedestal 210. Hydraulic cylinder 208 will provide the power for raising and lowering heating element pedestal 210. To aid in assuring that pedestal 210 travels in a perpendicular direction to the horizon there are provided guide rods 216 and 216a which are attached to the underside of pedestal 210. Guide rods 216 and 216a pass through guide collars 218 and 218a, respectively, which collars are attached to mounting plate 206. Heating elements 212 and 212a are attached to heating element pedestal 210 by means of bolts 234 and 234a and plates 254, 250, 254a and 250a in the manner shown in FIGS. 8, 9 and 10.

Heating elements 212 and 212a can be any type of heating element capable of supplying heat to preforms "P." Preferentially heating elements 212 and 212a will be banks of electrical heating coils. As mentioned previously, it may be desirable to cool preforms "P" prior to their arrival at the blow molding station. If this is the case, then heating elements 212 and 212a would be replaced with cooling elements which might comprise hollow collars with forced air being blown therethrough onto the preform.

In operation heating station 14 is the paragon of simplicity. Preforms "P" are brought into position above first heating station 14 from the injection molding station 12. Once the preforms have come to a full stop double acting hydraulic cylinder 208 is activated to raise heating elements 212 and 212a so that they each surround their respective preform "P." The heating elements are held in this position as long as needed to achieve the degree of heating desired. After preforms "P" have reached the desired heat level double acting hydraulic cylinder 208 lowers the heating elements from around the preforms. The lowered position is shown in FIG. 8 while the fully raised position is shown in FIG. 9. After the heating elements have been brought to the lowered position, the preforms are free to continue their movement towards second heating station 16 upon rotation of table 600.

Figure 11:
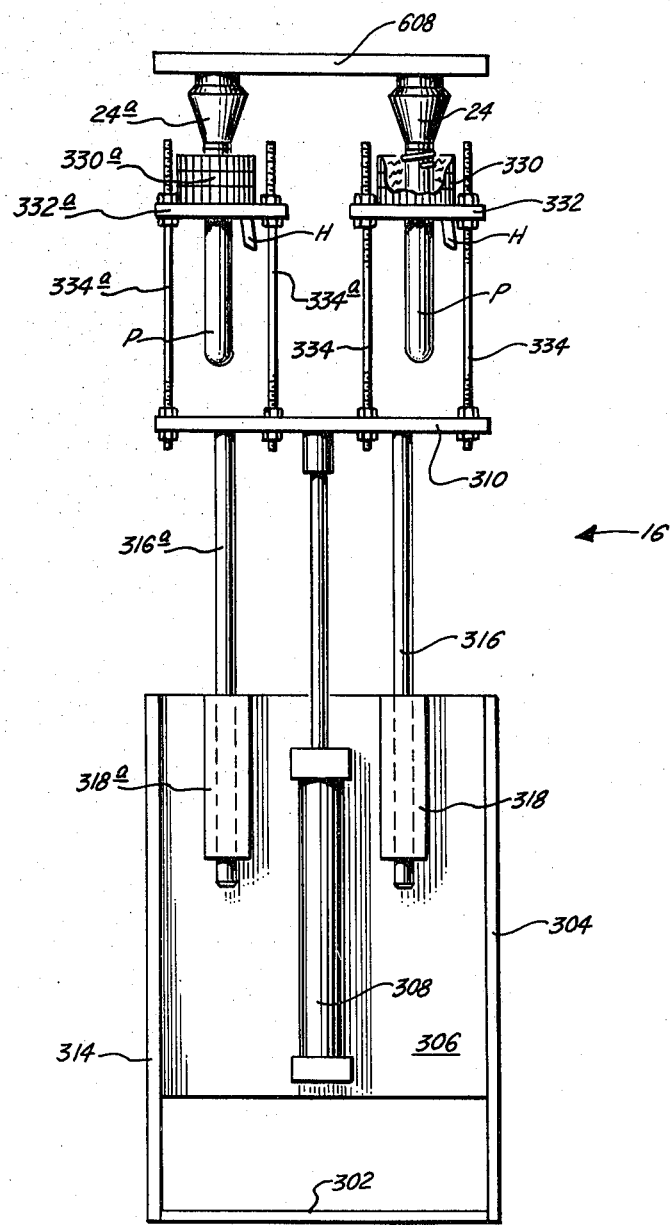
FIG. 11 is a front elevational view of another heating station shown in FIG. 1.
Figure 12:
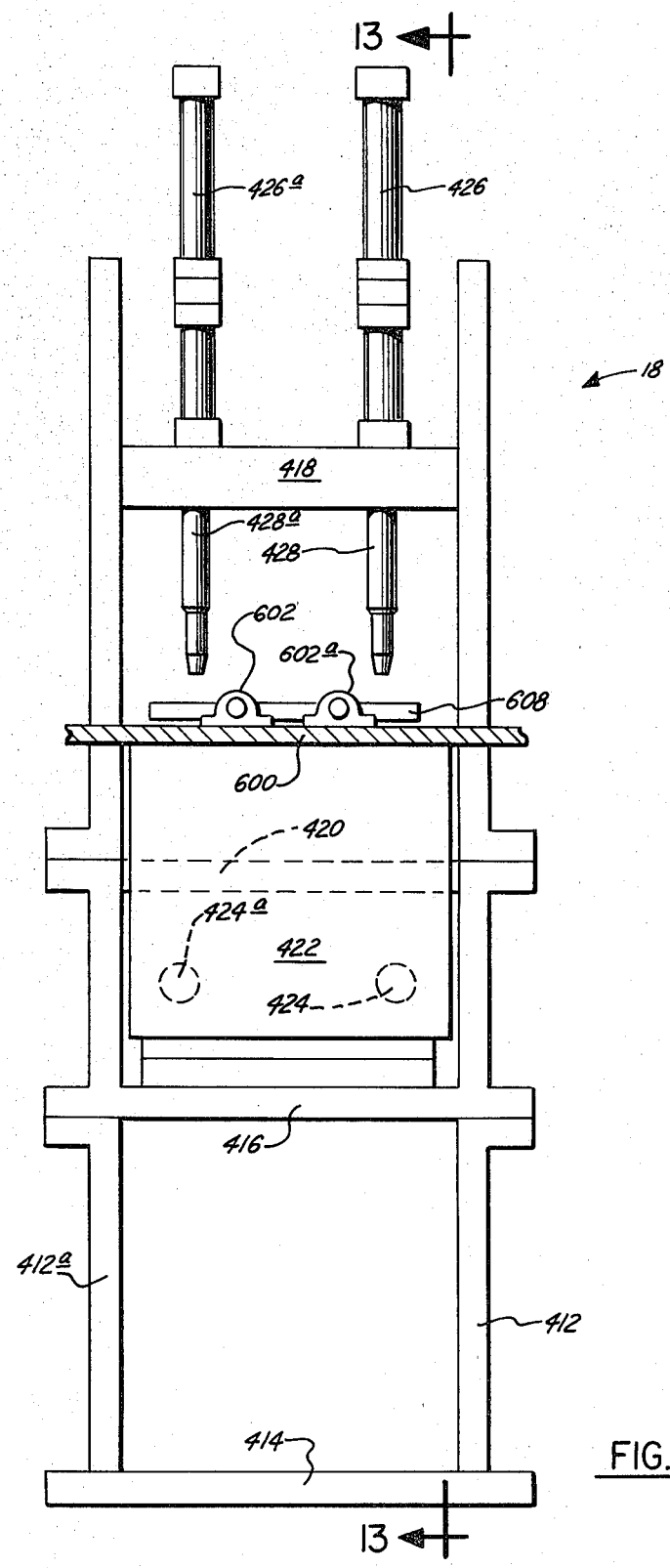
FIG. 12 is a front elevational view of the blow molding station shown in FIG. 1.

In FIG. 11 there is depicted a second heating station 16. This heating station is typical of one which may be utilized to heat program the preform. Note that the heating elements 330 and 330a only surround the upper portion of the preforms "P" to provide selective heating. These heating elements may be of the same type used at station 14, i.e., electrical heating coils. Second heating station 16 has two side plates 304 and 314 which are tied at their bottom by tying bar 302. Also connecting side plates 304 and 314 together is mounting plate 306. Attached to mounting plate 306 is double acting hydraulic cylinder 308 which is connected to heating element pedestal 310. Guide rods 316 and 316a which are attached to the underside of heating pedestal 310 pass through guide collars 318 and 318a which collars are attached to mounting plate 306. Double acting hydraulic cylinder 308 is utilized to raise and lower heating element pedestal 310 while guide rods 316 and 316a, in conjunction with guide collars 318 and 318a, assure perpendicular motion of heating element pedestal 310. Heating elements 330 and 330a are mounted to heat element plates 332 and 332a, respectively, with these plates being secured by bolts 334 and 334a. As is the case with first heating station 14, the preforms "P" are brought into position above heating elements 330 and 330a with the heating element pedestal 310 in the lowered position. Once preforms "P" are in position, double acting pneumatic cylinder 308 raises heating element pedestal 310 so that heating elements 330 and 330a are in proper position around preforms "P." After the necessary heating has been accomplished double acting hydraulic cylinder 308 is activated to lower heating pedestal 310 thus removing heating elements 330 and 330a from around preforms "P" so that these preforms may be sent to the next station without interference with the heating elements.

As is the case with station 14, station 16 can be used to cool the preforms "P" or alternatively, it may be used to apply heat longitudinally to two sides of the preform with strip heaters thereby heat programming the preform so that it may be blown to a container which is elliptical in cross section and so that the container has improved uniformity of wall thickness.

As can be seen in FIG. 1, there is provided space for an additional station between second heating station 16 and blow molding station 18. An additional heating or cooling station may be utilized at this point as the need arises.

After the preforms have been heat treated they are in condition for receipt by the blow molding station 18. As mentioned previously, blow molding station 18 may be one in which the heat treated preforms are blown without biaxial orientation or with biaxial orientation. The station depicted in FIGS. 12–16 is one in which either type of blow forming of the container can be practiced.

Figure 13:
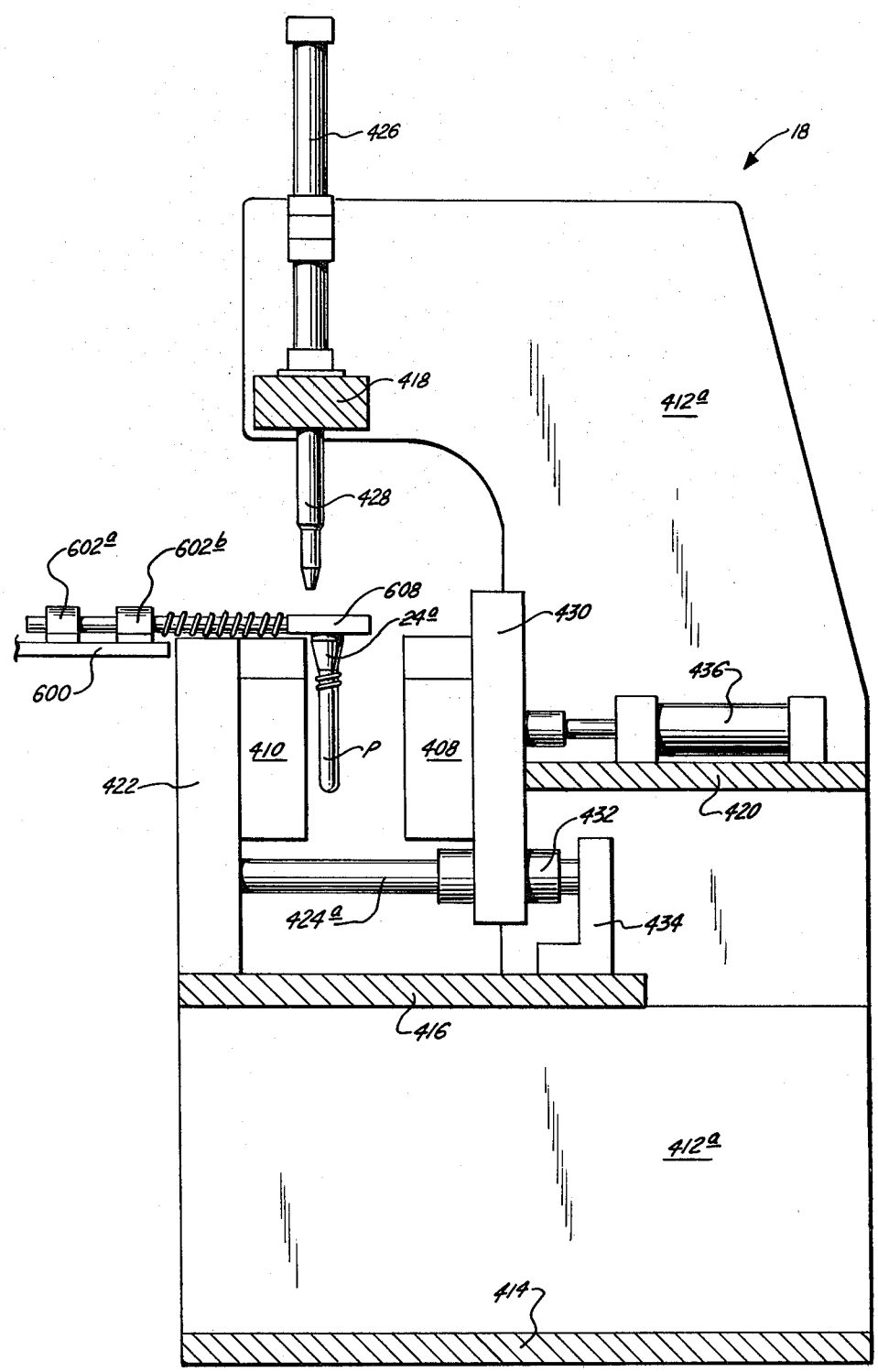
FIG. 13 is a sectional view taken through section lines 13—13 of FIG. 12.

Blow molding station 18 has a frame which includes side plates 412 and 412a which are connected to floor plate 414 at their lower ends. Also tying side plates 412 and 412a together are mounting stud 418, upper mounting plate 420 and lower mounting plate 416. Lower mounting plate 416 has, at its end closest to table 600, front platen 422 which is rigidly attached thereto. At its other end, lower mounting plate 416 has rigidly attached thereto bracket 434. Connecting front platen 422 with bracket 434 are blow molding guide rods 424 and 424a. These rods pass through guide sleeves which are made a part of rear platen 430. One of the guide sleeves, guide sleeve 432, is shown in FIG. 13 and is identical to the guide sleeve around blow molding guide rod 424. Connected to the inside face of front platen 422 is a split blow mold half 410. Connected to the inside face of back platen 430 is the other split blow mold half 408. Each of these halves has a pair of cavities cut therein which cavities together form a pair of blow mold cavities for blow forming the preform to yield the final container. The number of cavities found in the blow split molds should correspond to the number of preforms which will arrive at the blow molding station. As shown in FIGS. 14 and 15, the blow mold cavities, "C," define the shape of the bottle to which the preform is blown. In addition, each cavity has contiguous therewith a handle cavity "HC." Handle cavity "HC" is larger than handle "H" so that handle "H" has room to move as preform "P" is blown. This movement is illustrated sequentially in FIGS. 14-16. In FIG. 14 handle "H" is at its nearest point to the center axis of preform "P." As preform "P" expands, handle "H" moves outwardly as seen in FIG. 15. Handle cavity "HC" is of a size to let handle "H" move without interference throughout the blow cycle as is shown in FIG. 16 wherein handle "H" has moved to its fartherest extent. Handle cavity "HC" does not need to be larger than handle "H" if, due to inflation, handle "H" does not move. This latter case would arise, for example, if the bottle neck was the same diameter as the preform.

Horizontal movement of split mold half 408 is accomplished by the utilization of double acting hydraulic cylinder 436 which is mounted to upper mounting plate 420 and the outside face of rear platen 430. By having rear platen 430 slidably mounted to blow mold guide rods 424 and 424a true horizontal movement of split blow mold half 408 is achieved for perfect matching with split blow mold half 410.

Above the two cavities defined by split blow mold halves 408 and 410 are blow pins 428 and 428a. These blow pins are provided with vertical movement so that they may enter into the hollow portion of the mandrels which are a part of attaching mechanism 11. This vertical motion is made possible by way of double acting hydraulic cylinders 426 and 426a. Double acting hydraulic cylinders 426 and 426a also provide the power required to raise and lower stretch rod 429 which is shown in FIGS. 14-16.

FIGS. 14-16 depict blowing of bottle "B" from preform "P." In operation, the table rotates and stops with the preforms being positioned between split blow mold halves 408 and 410. Split blow mold half 408 is moved forward towards the table to close the split blow molds and, in this travel, engages a portion of beveled surfaces 618 and 620 within the blow mold carrier cavity thereby pushing attaching mechanism 11 until split blow mold halves 410 and 408 completely encircle beveled surfaces 618 and 620. The handled preforms are now centered and positioned within the cavity formed by the split blow mold halves. Next, blow pin 428 is introduced through the opening end of mandrel 24 and seated therein. Once blow pin 428 has been seated, stretch rod 429 is lowered until it makes contact with the bottom of the preform. Once contact has been made, blow fluid is introduced through blow pin 428 to begin inflation of preform "P." Simultaneously stretch rod 429 moves towards the bottom of the cavity formed by split blow mold halves 410 and 408 as is shown in FIG. 15. Simultaneous axial and radial stretch results in the container being biaxially oriented and blown to conform to the blow mold cavity as is shown in FIG. 16.

The operation of blow pin 428a is identical to the operation of blow pin 428 and thus the description of the latter blow pin operation is equally applicable to the former blow pin.

Once the preform has been blown to form bottle "B" cooling fluid is passed through cooling traces 431 and 431a to cool the blown container. Once sufficient cooling has been achieved to insure that the container is rigid enough so that support from the blow mold cavity is no longer required, rod 429 is retracted and blow pin 428 is raised clear of mandrel 24. Double acting hydraulic cylinder 436 is activated pulling split blow mold half 408 away from split blow mold half 410. The blown container which is still mounted to mandrel 24 will follow split blow mold half 408 for a short distance due to the action of follower rod springs 606 and 606a. Once attaching apparatus 11 has traveled its full extent, split blow mold half 408 continues to travel away from split blow mold half 410 until a gap of sufficient dimension is achieved between the two split blow mold halves to permit free movement of containers "B" when table 600 rotates to the next station.

It is to be understood that biaxial orientation can also be achieved by stretching of preform "P" with stretch rod 429 to achieve an axial stretch and then subsequently utilizing blow air to inflate the preform to conform to the cavity formed by split blow mold halves 410 and 408.

To achieve blow molding without biaxial orientation the procedure described above is followed except that stretch rod 429 is left in the retracted position and is not activated at all. Thus blow fluid is introduced through blow pin 428 without benefit of the axial stretch provided by stretch rod 429.

Figure 18:
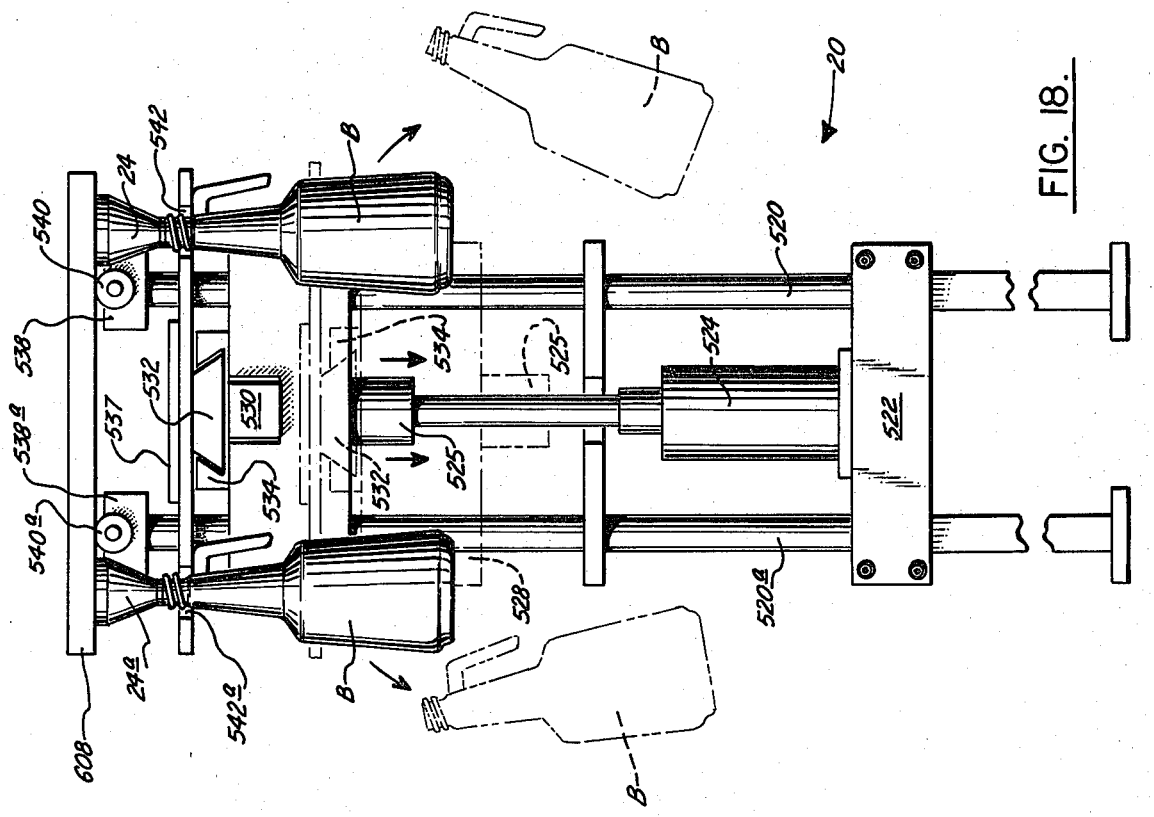
FIG. 18 is a front elevational view of the ejection system shown in FIG. 17.
Figure 17:
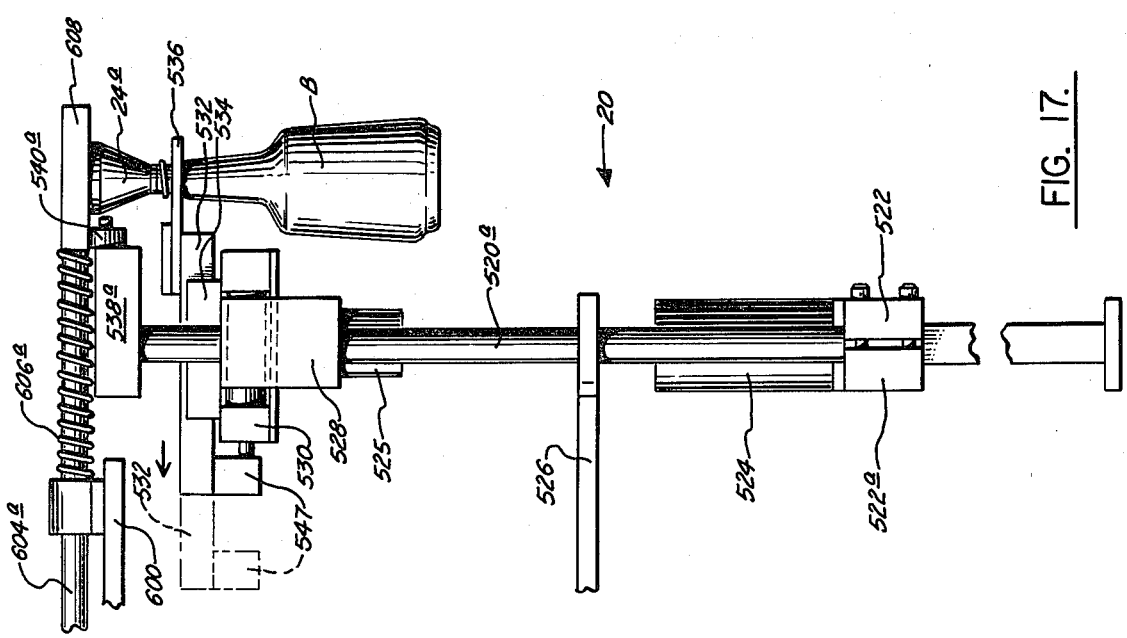
FIG. 17 is a side elevational view of the ejection system shown in FIG. 1.

Removal of bottles "B" from mandrels 24 and 24a is automatically achieved by the utilization of ejection station 20 which is shown in FIGS. 17 and 18. As can be seen ejection station 20 has a pair of upstanding legs 520 and 520a. Joining these legs together at a point near their bottom are studs 522 and 522a which are bolted together as shown in FIG. 17. Mounted on studs 522 and 522a is double acting hydraulic cylinder 524. Double acting hydraulic cylinder 524 has its rod end connected to block 528. Providing more support for legs 520 and 520a is support member 526 which may be tied into a reinforced concrete bulkhead or the like. As mentioned above, double acting hydraulic cylinder 524 is attached to block 528. Block 528 is slidably mounted on legs 520 and 520a and will move upward and downward along these legs in response to the action of double acting hydraulic cylinder 524. A recess is provided in block 528 for holding a second double acting hydraulic cylinder 530. Second double acting hydraulic cylinder 530 is attached to bracket 547 which in turn is attached to slide 532. Second double acting hydraulic cylinder 530 will move slide 532 back and forth along a horizontal plane. Slide 532 is trapezoidol in cross-section and fits within a trapezoidol cut in guide block 534. Guide block 534 therefore assures proper horizontal motion of slide 532 and helps support slide 532 throughout its travel. Attached to the top of slide 532 is knockoff plate 536. Knockoff plate 536 has two semicircular cuts made therein, 542 and 542a, which allow knockoff plate 536 to move around the necks of bottles "B" so that interference between knockoff plate 536 and the bottles "B" will occur when knockoff plate 536 is moved downward in a vertical direction. Holding knockoff plate 536 to slide 532 is accomplished by bolting attaching plate 537 over knockoff plate 536 and to slide 532.

To provide support for attaching mechanism 11 there are provided support rollers 540 and 540a. Support roller 540a is rotatably carried by roller mount 538a while support roller 540 is carried by roller mount 538.

As can be seen in FIGS. 17 and 18, support rollers 540a and 540 contact plate 608 to provide resistance to deflection of attaching member 11 when knockoff plate 536 is lowered and brought into contact with bottles "B" to remove them from mandrels 24 and 24a.

In operation, bottles "B" are brought from blow molding station 18 to a position in front of ejection station 20. Knockoff plate 536 is in a retracted and uppermost position. After bottles "B" are in proper registration with ejection station 20, second double acting hydraulic cylinder 530 is activated causing slide 532 to move away from table 600 and thus bring knockoff plate 536 into position so that semicircular cuts 542a and 542 are about the neck portion of bottles "B." Consequently, double acting hydraulic cylinder 524 is activated bringing block 528 downward causing knockoff plate 536 to likewise move downward and engage bottles "B" and knock them from mandrels 24 and 24a. After bottles "B" have been so removed, hydraulic cylinder 524 is activated thereby bringing knockoff plate 536 to its uppermost position. Also second double acting hydraulic cylinder 530 is activated to cause knockoff plate 536 to be retracted.

With the ejection station 20 in this position, table 600 is rotated to the next station which is injection molding station 12 so that the process can again be repeated.

Timing of the rotation of table 600 and the activation of the various stations is accomplished by utilizing well known techniques which are familiar to those skilled in the art. Most systems will utilize a combination of electrical switches and photoelectric sensors as activating and sensing hardware. The residence time spent at any one station by attaching mechanism 11 will be determined by the time required by the slowest station. Generally speaking, the slowest station is injection station 12, however, any of the other stations may require more time depending upon the particular requirements of the user of the apparatus of this invention. If injection molding station 12 requires the longest residence time, then the other stations will simply achieve their designated purpose and will be waiting for rotation of table 600 when the injection forming is accomplished.

What is claimed is:

1. A process for injection blow molding hollow plastic bodies having an injection molded integral handle, said process comprising:
   a. positioning a hollow preform carrier between an open split injection mold;
   b. closing said injection mold to form an injection mold cavity with a contiguous injection mold handle cavity and a preform carrier cavity, said preform cavity enclosing at least a portion of said preform carrier upon said closing of said injection mold;
   c. inserting a preform pin through said preform carrier into said injection mold cavity;
   d. injecting thermoplastic material into the recess defined at least partially by said injection mold cavity, said handle cavity and said preform pin to form a thermoplastic preform having a solid injection molded handle;
   e. cooling said thermoplastic preform to a temperature at which it will maintain its basic shape when said injection mold is opened;
   f. withdrawing said preform pin from said injection mold cavity;
   g. opening said injection mold;
   h. moving said injection molded preform on said preform carrier from said split injection mold to a split blow mold having a handle cavity that is larger than said handle and having a neck cavity that has a larger diameter at the point of juncture with said handle cavity than the diameter of said preform; and
   i. inflating said preform to the shape defined by said blow mold cavity while allowing said handle to move outwardly in said handle cavity as the portion of said preform adjacent said neck cavity moves outwardly into contact with the walls of said neck cavity.

2. The process of claim 1 wherein between steps (g) and (h) said injection molded preform is temperature conditioned by either heating or cooling to bring the temperature of said preform to its orientation temperature.

3. The process of claim 1 wherein contemperaneous with said inflation said preform is biaxially stretched so that biaxial orientation of said hollow plastic body is achieved.

* * * * *